(12) United States Patent
Ando et al.

(10) Patent No.: US 8,216,544 B2
(45) Date of Patent: Jul. 10, 2012

(54) ZNO VARISTOR POWDER (75) Inventors: Hideyasu Ando, Kawasaki (JP); Yasunori Kasuga, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 186 days.

(21) Appl. No.: 12/529,773

(22) PCT Filed: Mar. 5, 2008

(86) PCT No.: PCT/JP2008/000446
§ 371 (c)(1), (2), (4) Date: Feb. 3, 2010

(87) PCT Pub. No.: WO2008/120444
PCT Pub. Date: Oct. 9, 2008

(65) Prior Publication Data
US 2010/0136337 A1 Jun. 3, 2010

(30) Foreign Application Priority Data
Mar. 5, 2007 (JP) .................. 2007-054681

(51) Int. Cl.
*B32B 5/16* (2006.01)
*C01G 9/02* (2006.01)
*H01C 8/00* (2006.01)

(52) U.S. Cl. ... 423/622; 333/223; 423/101; 423/594.19; 423/594.3; 423/594.5; 423/594.7; 423/599; 423/600; 428/402

(58) Field of Classification Search .................. 428/402; 423/594.19–594.7, 599, 600, 622; 338/223, 338/224
See application file for complete search history.

(56) References Cited

U.S. PATENT DOCUMENTS

| | | | |
|---|---|---|---|
| 6,124,549 A | 9/2000 | Kemp et al. | |
| 6,184,771 B1 | 2/2001 | Suzuki et al. | |
| 6,620,346 B1 * | 9/2003 | Schulz et al. | ............ 252/519.51 |
| 6,627,100 B2 | 9/2003 | Ando et al. | |
| 6,864,432 B2 | 3/2005 | Boettcher et al. | |

(Continued)

FOREIGN PATENT DOCUMENTS
JP 04-245601 A 9/1992
(Continued)

OTHER PUBLICATIONS

Strumpler et al., "Smart Varistor Composites," Proceed. 8th CIMTEC Ceramic Congress & Forum New Material Symposium, pp. 15-22, 1995.

*Primary Examiner* — Hoa (Holly) Le
(74) *Attorney, Agent, or Firm* — Foley & Lardner LLP (57) ABSTRACT

A ZnO varistor powder can be obtained with high operating voltage and excellent current-voltage nonlinear resistance characteristics. In the ZnO varistor powder, the main ingredient is zinc oxide (ZnO); and at least bismuth (Bi), cobalt (Co), manganese (Mn), antimony (Sb), nickel (Ni), and aluminum (Al), calculated as $Bi_2O_3$, $Co_2O_3$, $MnO$, $Sb_2O_3$, $NiO$, and $Al^{3+}$, are contained as accessory ingredients in amounts of 0.3 to 1.5 mol % $Bi_2O_3$, 0.3 to 2.0 mol % $Co_2O_3$, 0.3 to 3 mol % $MnO$, 0.5 to 4 mol % $Sb_2O_3$, 0.5 to 4 mol % $NiO$, and 0.0005 to 0.02 mol % $Al^{3+}$. ZnO content is greater than or equal to 90 mol %; the bulk density is greater than or equal to 2.5 g/cc; the powder is a spherical powder in which the 50% particle diameter in the particle size distribution is 20 μm to 120 μm.

2 Claims, 6 Drawing Sheets

U.S. PATENT DOCUMENTS

| | | |
|---|---|---|
| 2002/0121960 A1 | 9/2002 | Ando et al. |
| 2004/0129449 A1 | 7/2004 | Boettcher et al. |

FOREIGN PATENT DOCUMENTS

| | | |
|---|---|---|
| JP | 04-245602 A | 9/1992 |
| JP | 04-253302 A | 9/1992 |
| JP | 05-258920 A | 10/1993 |
| JP | 07-249505 A | 9/1995 |
| JP | 08-031615 A | 2/1996 |
| JP | 08-115805 A | 5/1996 |
| JP | 10-308303 A | 11/1998 |
| JP | 11-340009 A | 12/1999 |
| JP | 2000-503454 T | 3/2000 |
| JP | 2001-233668 A | 8/2001 |
| JP | 2001-307909 A | 11/2001 |
| JP | 2004-522259 T | 7/2004 |
| JP | 2005-348596 A | 12/2005 |
| JP | 2007-329174 A | 12/2007 |
| JP | 2007-329175 A | 12/2007 |
| JP | 2007-329178 A | 12/2007 |
| WO | WO 97/26693 A1 | 7/1997 |
| WO | WO 02/065486 A1 | 8/2002 |

* cited by examiner

ZNO VARISTOR POWDER

TECHNICAL FIELD

This invention relates to a powdered composition (commonly referred to as a varistor powder) that is suited to the production of a current-voltage nonlinear resistor used for electric field relaxation of high electric field portions of high voltage equipment, and more particularly relates to a varistor powder whose main ingredient is zinc oxide (ZnO) that has current-voltage nonlinear resistance characteristics.

BACKGROUND ART

Electric field relaxation technology for suppressing the local accumulation of electric field is commonly used in high voltage equipment that are used for electric power system and the like. One electric field relaxation method for high electric field portions involves dispersing a powder having current-voltage nonlinear resistance characteristics in a polymer matrix that is an insulator, and using this varistor powder/polymer matrix composite as a varistor.

For example, Patent Document 1 discloses a technique of using a polymer matrix in which is dispersed a ZnO varistor powder for the electric field relaxation of terminals or joints of power cables. Patent Document 2 discloses a technique of using a polymer matrix in which is dispersed a ZnO varistor powder for the electric field relaxation of polymer bushings. Further, Patent Document 3 discloses a technique of using a polymer matrix in which is dispersed a ZnO varistor powder for the electric field relaxation of lightning arresters.

Also, it is stated in Non-Patent Document 1 that the operating voltage of a varistor powder/polymer matrix can be controlled by baking a ZnO varistor powder used for electric field relaxation for 4 to 20 hours at a temperature of from 935° C. to 1320° C., or by changing the amount of ZnO varistor powder in the polymer matrix.

Patent Document 1: Published Japanese Translation of PCT Application No. 2000-503454
Patent Document 2: Published Japanese Translation of PCT Application No. 2004-522259
Patent Document 3: Japanese Patent Application Laid-Open No. 2005-348596
Non-Patent Document 1: Strumpler et al., "Smart Varistor Composites," Proceed. 8th CIMTEC Ceramic Congress & Forum New Material Symposium, pp. 15-22

Incidentally, increasing nonlinearity and raising the withstand voltage of a varistor powder are even more important with a varistor powder that is used for obtaining a varistor powder/polymer matrix (electric field relaxation composite) that can exhibit an excellent electric field relaxation effect in a high electric field portion.

Specifically, to improve the withstand voltage characteristics of an electric field relaxation composite, it is necessary to raise the operating voltage of a ZnO varistor powder, and to improve the electric field relaxation effect of an electric field relaxation composite, it is necessary to enhance the current-voltage nonlinear resistance characteristics of a ZnO varistor powder.

However, with the prior art discussed in the above-mentioned patent documents and non-patent document, the varistor powder had inadequate withstand voltage and nonlinearity, and when it was applied to a portion of extremely high electric field, the electric field relaxation composite had to be made thicker in the electric field direction, or the proportion of varistor powder (the electroconductive ingredient) in the electric field relaxation composite had to be reduced, in order to raise the withstand voltage of the electric field relaxation composite.

In this case, if the proportion of varistor powder (the electroconductive ingredient) in the electric field relaxation composite is reduced, this creates a problem in that the current-voltage nonlinear resistance characteristics deteriorate in an electric field relaxation composite containing a varistor powder with nonlinear resistance characteristics, and the electric field relaxation effect of the electric field relaxation composite is diminished.

Furthermore, even if the proportion in which the varistor powder is contained in the electric field relaxation composite is not reduced, it is important that the ZnO varistor powder have excellent current-voltage nonlinear resistance characteristics in order for the electric field relaxation composite to exhibit an excellent electric field relaxation effect.

DISCLOSURE OF THE INVENTION

The present invention was devised in light of the above problems, and it is an object thereof to provide a ZnO varistor powder with which a varistor powder/polymer matrix with high withstand voltage characteristics and an excellent electric field relaxation effect (that is, an electric field relaxation composite) can be obtained.

The present invention was accomplished as a result of conducting various research into a ZnO varistor powder composition having current-voltage nonlinear resistance characteristics, a method for manufacturing this composition, etc., in an effort to achieve the stated object.

The ZnO varistor powder of the present invention is a varistor powder that is dispersed in a polymer matrix to obtain a composite used for electric field relaxation, wherein the main ingredient is zinc oxide (ZnO); at least bismuth (Bi), cobalt (Co), manganese (Mn), antimony (Sb), nickel (Ni), and aluminum (Al), calculated as $Bi_2O_3$, $CO_2O_3$, MnO, $Sb_2O_3$, NiO, and $Al^{3+}$, are contained as accessory ingredients in amounts of 0.3 to 1.5 mol % $Bi_2O_3$, 0.3 to 2.0 mol % $CO_2O_3$, 0.3 to 3 mol % MnO, 0.5 to 4 mol % $Sb_2O_3$, 0.5 to 4 mol % NiO, and 0.0005 to 0.02 mol % $Al^{3+}$; the zinc oxide (ZnO) content is greater than or equal to 90 mol %; the bulk density is greater than or equal to 2.5 g/cc; the powder is a spherical powder in which the 50% particle diameter in the particle size distribution is 20 μm to 120 μm; the particle size deviation in the particle size distribution ((86% particle diameter−16% particle diameter)/2) is greater than or equal to 15 μm; and the ZnO primary crystal mean particle diameter is less than or equal to 10 μm.

With the present invention, the ZnO and the various ingredients added to it are set to a favorable balance, which allows a ZnO varistor powder to be obtained with high operating voltage and excellent current-voltage nonlinear resistance characteristics.

EXPLANATION OF REFERENCE NUMERALS

| | |
|---|---|
| 1 | ZnO primary crystals |
| 2 | varistor powder |
| 3 | polymer matrix |

BEST MODE FOR CARRYING OUT THE INVENTION

A typical composition of the ZnO varistor powder of the present invention, and the method for manufacturing this composition will now be discussed.

First, a ZnO powder (the main ingredient) and other contained ingredient powders were put into an aqueous solution in which a dispersant or other such organic substance had been dissolved, and the ingredients were mixed to produce a uniform slurry. Next, the slurry thus obtained, for example, was subjected to spray granulation in a spray dryer to produce a spherical granulated powder. The obtained granulated powder was put in a container for baking and heat treated at a temperature of from 300° C. to 500° C. in an electric furnace, to decompose and scatter the organic substance in the granulated powder. Subsequently, the resulting powder was baked at a temperature of from 900° C. to 1200° C. The baked powder was passed through a sieve with a mesh opening of 100 μm to 300 μm, which gave a ZnO varistor powder.

Figure 1:
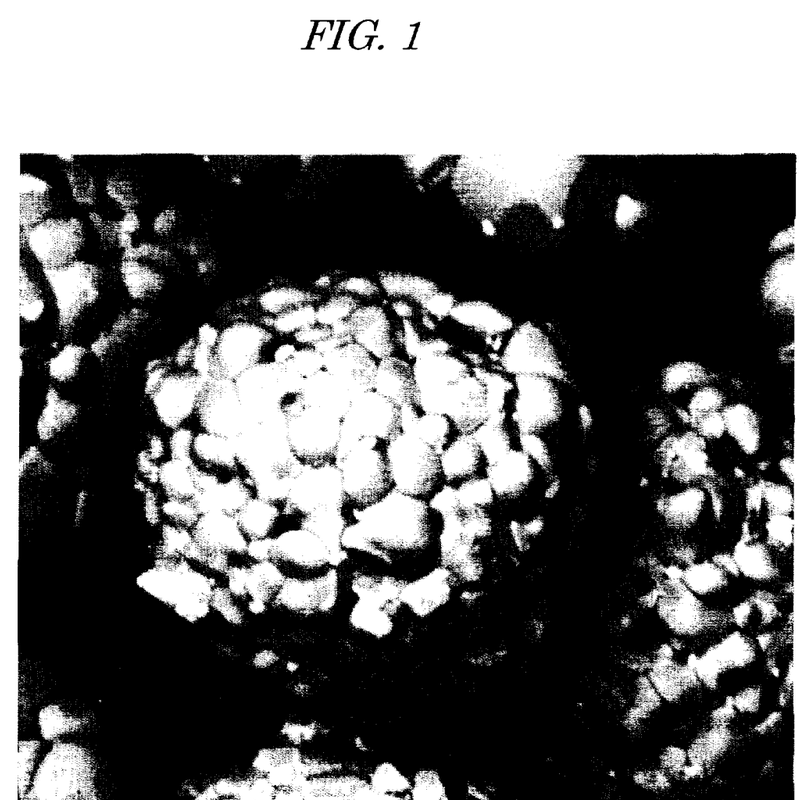
FIG. 1 is a scanning electron micrograph of the ZnO varistor powder of the present invention.

A typical scanning electron micrograph of the ZnO varistor powder thus produced is shown in FIG. 1, and it can be seen that the powder was substantially spherical.

Figure 2:
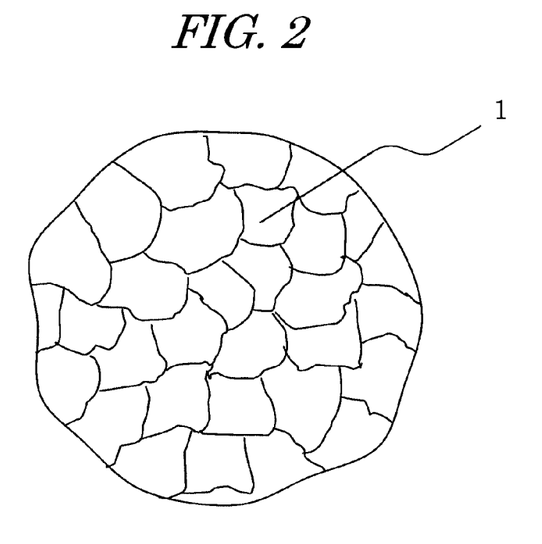
FIG. 2 is a schematic of how the ZnO varistor powder of the present invention looks.

FIG. 2 is a schematic of the ZnO varistor powder, and it can be seen that the ZnO varistor powder is polycrystalline, composed of numerous ZnO primary crystals.

Figure 3:
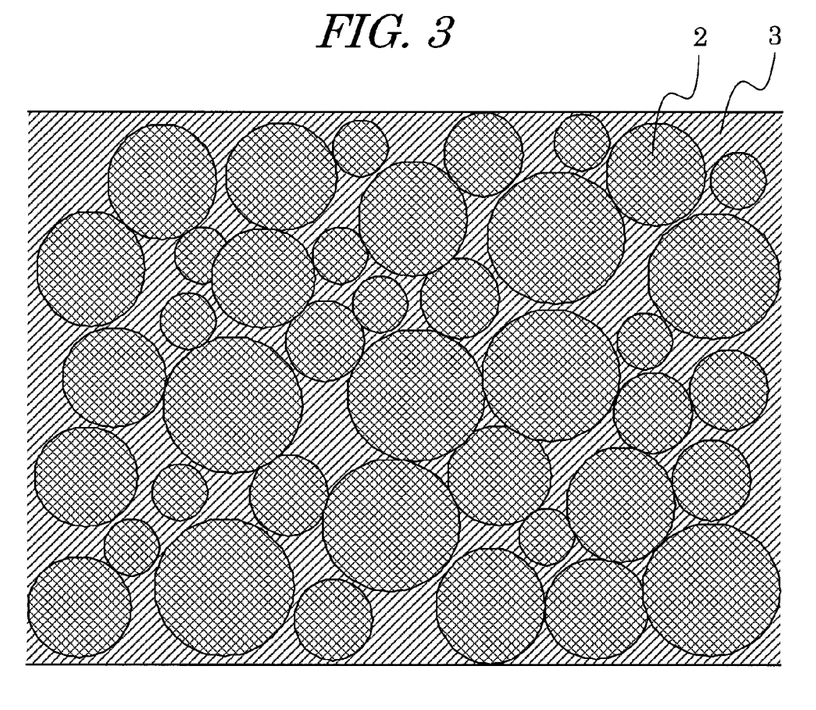
FIG. 3 is a schematic of a cross section of an electric field relaxation composite in which the varistor powder of the present invention is used.

Then, an electric field relaxation composite was produced in which this ZnO varistor powder was dispersed in a polymer matrix. An epoxy resin, for example, can be used for this polymer matrix. The ZnO varistor powder was allowed to naturally settle in the epoxy resin, and the amount of ZnO varistor powder dispersed in the polymer matrix was within a range of from 30 to 50 vol %. FIG. 3 is a schematic of a cross section of the electric field relaxation composite.

Figure 4:
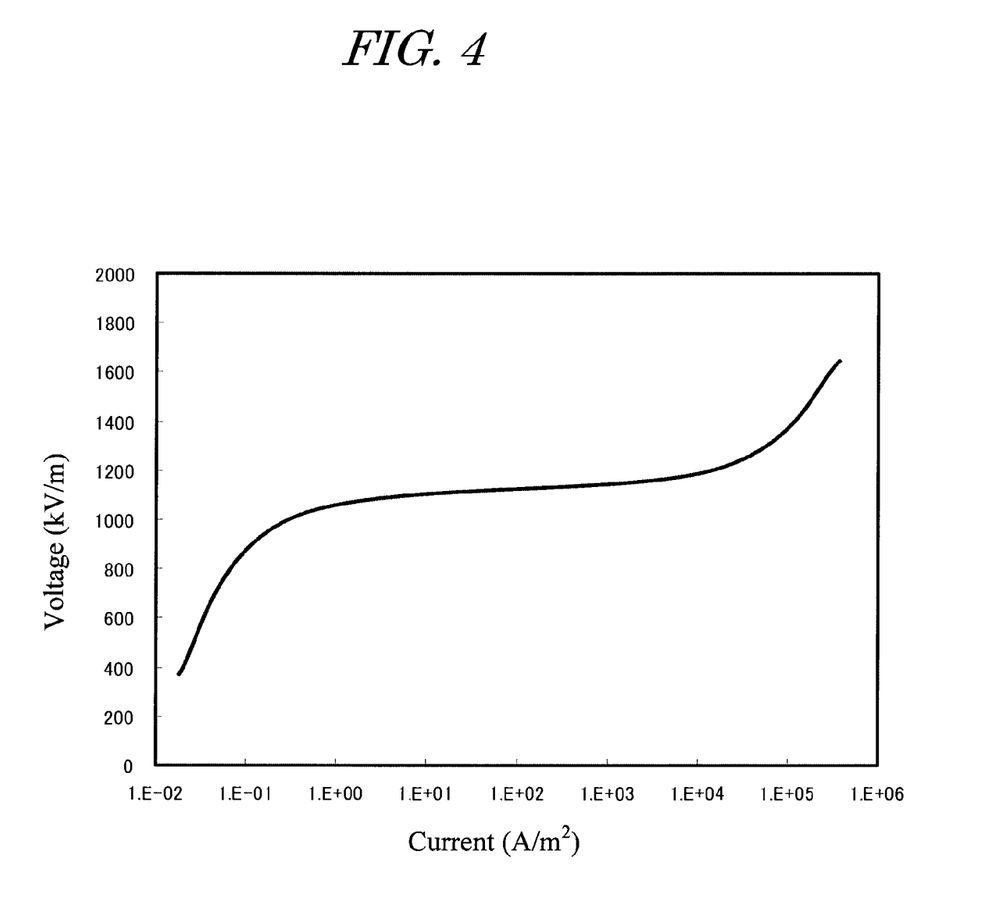
FIG. 4 is a graph of the current-voltage characteristics of the electric field relaxation composite pertaining to the present invention.

In measuring the electrical characteristics of the ZnO varistor powder, an electric field relaxation composite produced by the above method was worked into a flat test piece with a thickness of 1 mm to 10 mm, electrodes were produced from silver paste, for example, on both sides, and the electrical characteristics were measured. FIG. 4 shows an example of the current-voltage characteristics measured for the ZnO varistor powder. In FIG. 4, the horizontal axis is the current ($A/m^2$), while the vertical axis is the voltage (kV/m).

For the operating voltage and current-voltage nonlinear resistance characteristics of the ZnO varistor powder, the operating voltage was evaluated using a value of V1 A, and the current-voltage nonlinear resistance characteristics was evaluated using a value of V100 kA/V1 A. That is, the higher is the value of V1 A, the higher is the operating voltage of the ZnO varistor powder, and the lower is the value of V100 kA/V1 A, the better are the current-voltage nonlinear resistance characteristics of the ZnO varistor powder.

Here, in the current-voltage characteristics in FIG. 4, V1A is the voltage (kV/m) when a current of 1 $A/m^2$ flows, and V100 kA is the voltage (kV/m) when a current of 100 $kA/m^2$ flows.

The relationship between the contained ingredients and the ZnO varistor powder characteristics are given below. Specifically, Table 1 shows the accessory ingredient contents and the ZnO varistor powder (operating voltage and current-voltage nonlinear resistance characteristics) when samples were produced by varying the amounts in which the accessory ingredients were contained.

TABLE 1

| Sample No. | Ingredient content (mol %) | | | | | | | Operating voltage V1A(kV/m) | Nonlinear resistance V100kA/V1A |
|---|---|---|---|---|---|---|---|---|---|
| | ZnO | Bi2O3 | Co2O3 | MnO | Sb2O3 | NiO | Al3+ | | |
| 1* | 93.9 | 0.10 | 1.00 | 1.00 | 2.00 | 2.00 | 0.005 | 1854 | 1.85 |
| 2 | 93.7 | 0.30 | 1.00 | 1.00 | 2.00 | 2.00 | 0.005 | 1453 | 1.52 |
| 3 | 93.0 | 1.00 | 1.00 | 1.00 | 2.00 | 2.00 | 0.005 | 1147 | 1.53 |
| 4 | 92.5 | 1.50 | 1.00 | 1.00 | 2.00 | 2.00 | 0.005 | 985 | 1.55 |
| 5* | 92.0 | 2.00 | 1.00 | 1.00 | 2.00 | 2.00 | 0.005 | 675 | 1.54 |
| 6* | 93.9 | 1.00 | 0.10 | 1.00 | 2.00 | 2.00 | 0.005 | 1254 | 1.75 |
| 7 | 93.7 | 1.00 | 0.30 | 1.00 | 2.00 | 2.00 | 0.005 | 1221 | 1.51 |
| 8 | 92.0 | 1.00 | 2.00 | 1.00 | 2.00 | 2.00 | 0.005 | 1150 | 1.53 |
| 9* | 91.0 | 1.00 | 3.00 | 1.00 | 2.00 | 2.00 | 0.005 | 1120 | 1.68 |
| 10* | 93.9 | 1.00 | 1.00 | 0.10 | 2.00 | 2.00 | 0.005 | 1098 | 1.70 |
| 11 | 93.7 | 1.00 | 1.00 | 0.30 | 2.00 | 2.00 | 0.005 | 1124 | 1.52 |
| 12 | 92.0 | 1.00 | 1.00 | 2.00 | 200 | 2.00 | 0.005 | 1145 | 1.51 |
| 13 | 91.0 | 1.00 | 1.00 | 3.00 | 2.00 | 2.00 | 0.005 | 1168 | 1.53 |
| 14* | 90.0 | 1.00 | 1.00 | 4.00 | 2.00 | 2.00 | 0.005 | 1200 | 1.68 |
| 15* | 94.7 | 1.00 | 1.00 | 1.00 | 0.30 | 2.00 | 0.005 | 849 | 1.58 |
| 16 | 94.5 | 1.00 | 1.00 | 1.00 | 0.50 | 2.00 | 0.005 | 954 | 1.54 |

TABLE 1-continued

| Sample No. | Ingredient content (mol %) | | | | | | Operating voltage | Nonlinear resistance |
|---|---|---|---|---|---|---|---|---|
| | ZnO | Bi2O3 | Co2O3 | MnO | Sb2O3 | NiO | Al3+ | V1A(kV/m) | V100kA/V1A |
| 17 | 94.0 | 1.00 | 1.00 | 1.00 | 1.00 | 2.00 | 0.005 | 1085 | 1.53 |
| 18 | 92.0 | 1.00 | 1.00 | 1.00 | 3.00 | 2.00 | 0.005 | 1254 | 1.52 |
| 19 | 91.0 | 1.00 | 1.00 | 1.00 | 4.00 | 2.00 | 0.005 | 1354 | 1.51 |
| 20* | 90.0 | 1.00 | 1.00 | 1.00 | 5.00 | 2.00 | 0.005 | 1485 | 1.68 |
| 21* | 94.7 | 1.00 | 1.00 | 1.00 | 2.00 | 0.30 | 0.005 | 1054 | 1.69 |
| 22 | 94.5 | 1.00 | 1.00 | 1.00 | 2.00 | 0.50 | 0.005 | 1053 | 1.54 |
| 23 | 94.0 | 1.00 | 1.00 | 1.00 | 2.00 | 1.00 | 0.005 | 1154 | 1.53 |
| 24 | 92.0 | 1.00 | 1.00 | 1.00 | 2.00 | 3.00 | 0.005 | 1189 | 1.51 |
| 25 | 91.0 | 1.00 | 1.00 | 1.00 | 2.00 | 4.00 | 0.005 | 1241 | 1.53 |
| 26* | 90.0 | 1.00 | 1.00 | 1.00 | 2.00 | 5.00 | 0.005 | 1385 | 1.70 |
| 27* | 94.0 | 1.00 | 1.00 | 1.00 | 2.00 | 1.00 | 0.0001 | 1841 | 1.90 |
| 28 | 94.0 | 1.00 | 1.00 | 1.00 | 2.00 | 1.00 | 0.0005 | 1642 | 1.58 |
| 29 | 94.0 | 1.00 | 1.00 | 1.00 | 2.00 | 1.00 | 0.001 | 1241 | 1.56 |
| 30 | 94.0 | 1.00 | 1.00 | 1.00 | 2.00 | 1.00 | 0.02 | 945 | 1.51 |
| 31* | 94.0 | 1.00 | 1.00 | 1.00 | 2.00 | 1.00 | 0.03 | 625 | 1.86 |
| 32* | 85.5 | 1.50 | 2.00 | 3.00 | 4.00 | 4.00 | 0.003 | 1541 | 1.68 |
| 33* | 88.5 | 1.50 | 2.00 | 2.00 | 3.00 | 3.00 | 0.003 | 1431 | 1.64 |
| 34 | 91.0 | 1.00 | 2.00 | 2.00 | 2.00 | 2.00 | 0.003 | 1384 | 1.56 |
| 35 | 92.5 | 1.00 | 1.50 | 1.50 | 1.50 | 2.00 | 0.003 | 1299 | 1.53 |

It can be seen in Table 1 that when the accessory ingredient contents are varied, the characteristics of the ZnO varistor powder vary greatly. Here, it can be seen that when an operating voltage V1 A of greater than or equal to 900 kV/m and current-voltage nonlinear resistance characteristics V100 kA/V1 A of less than or equal to 1.6 are used as conditions for an excellent ZnO varistor powder, a comparison of sample numbers 1 to 31 in Table 1 reveals that a ZnO varistor powder with excellent characteristics can be obtained by including 0.3 to 1.5 mol % $Bi_2O_3$, 0.3 to 2.0 mol % $Co_2O_3$, 0.3 to 3 mol % MnO, 0.5 to 4 mol % $Sb_2O_3$, 0.5 to 4 mol % NiO, and 0.0005 to 0.02 mol % $Al^{3+}$.

Next, a comparison of sample numbers 32 to 35 in Table 1 reveals that a ZnO varistor powder with excellent current-voltage nonlinear resistance characteristics can be obtained if the ZnO content is greater than or equal to 90 mol %. Note that the asterisks "*" in Table 1 denote samples that exhibit less desirable operating voltage and current-voltage nonlinear resistance characteristics in comparison to the other samples.

An experiment was then conducted in which the current-voltage characteristics and the bulk density, particle size distribution, ZnO primary crystal particle diameter, and the slurry viscosity during production were examined for various ZnO varistor powders.

(1) Bulk Density

Figure 5:
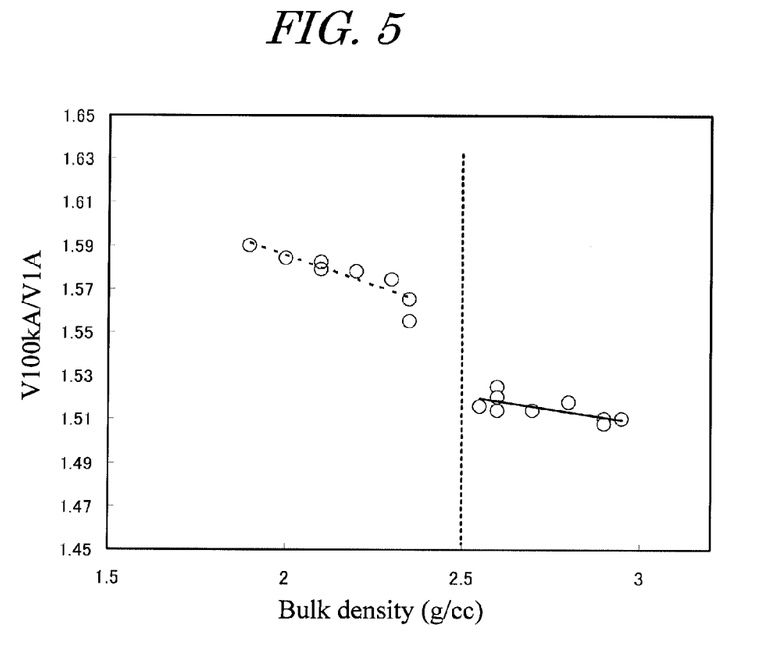
FIG. 5 is a graph of the relationship between the bulk density and current-voltage nonlinear resistance characteristics of the electric field relaxation composite pertaining to the present invention.

The relationship between current-voltage nonlinear resistance characteristics and bulk density of various ZnO varistor powders was examined, and the relationship between current-voltage nonlinear resistance characteristics and bulk density shown in FIG. 5 was obtained. It can be seen from FIG. 5 that superior current-voltage nonlinear resistance characteristics were obtained when the bulk density was greater than or equal to 2.5 g/cc.

The bulk density of the ZnO varistor powder here was measured according to JIS R 1639-2. The lower is the bulk density of the ZnO varistor powder, the more pores there are in the ZnO varistor power, and there are fewer contact points between the ZnO varistor powder particles when dispersed in the polymer matrix, and this is believed to adversely affect the current-voltage nonlinear resistance characteristics.

(2) Particle Size Distribution

Figure 6:
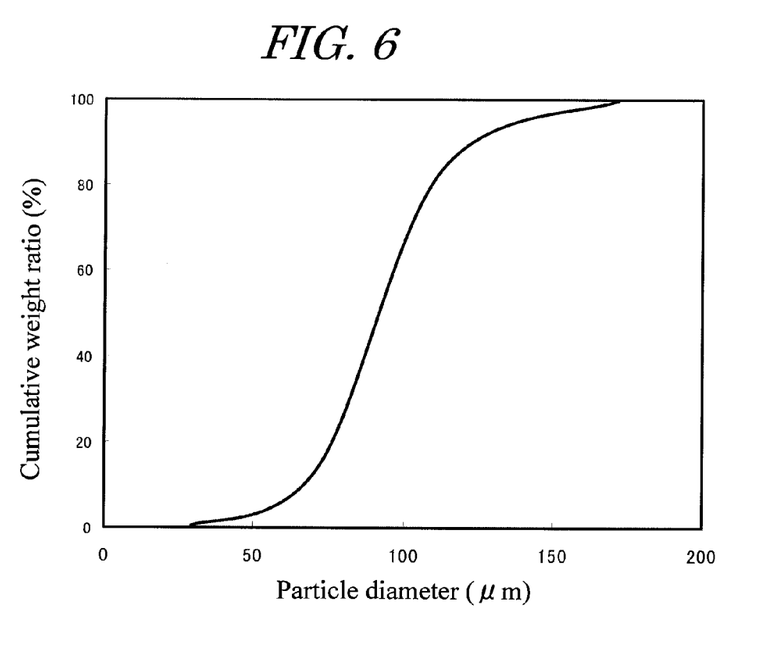
FIG. 6 is a graph of the particle size distribution of the ZnO varistor powder of the present invention.

FIG. 6 shows an example of the results of measuring the particle size distribution of the ZnO varistor powder by sieve method. The 50%, 86%, and 16% particle diameters are such that the cumulative weight ratios (%) on the vertical axis in FIG. 6 correspond to 50%, 86%, and 16%, respectively, particle diameters (μm) on the horizontal axis. The 50% particle diameter is a value that expresses the mean particle diameter, and the particle size deviation ((86% particle diameter−16% particle diameter)/2) is a value that expresses dispersion, and the greater is this value, the greater is the dispersion.

Figure 7:
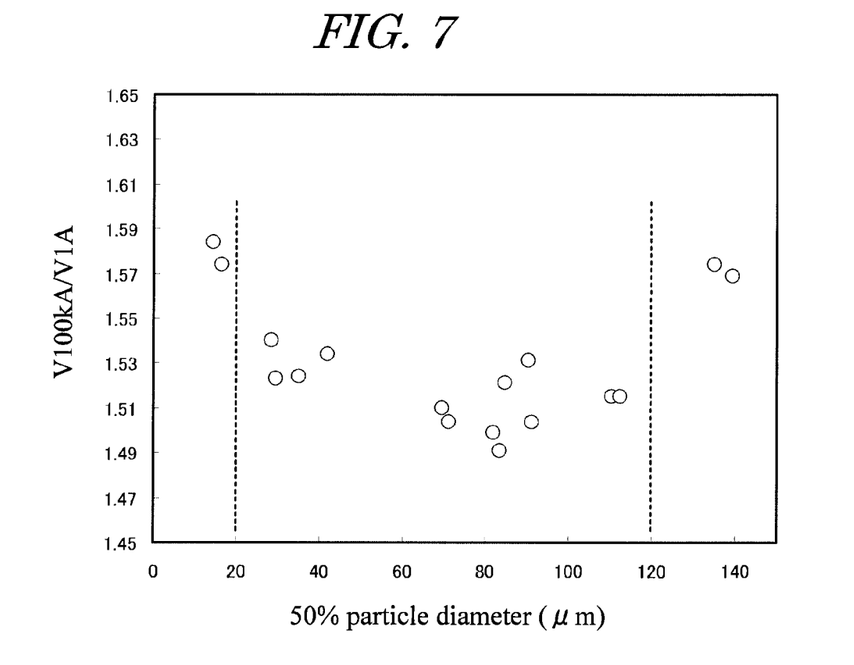
FIG. 7 is a graph of the current-voltage nonlinear resistance characteristics when the particle size distribution of the varistor powder of the present invention was varied (50% particle diameter in the particle size distribution)
Figure 8:
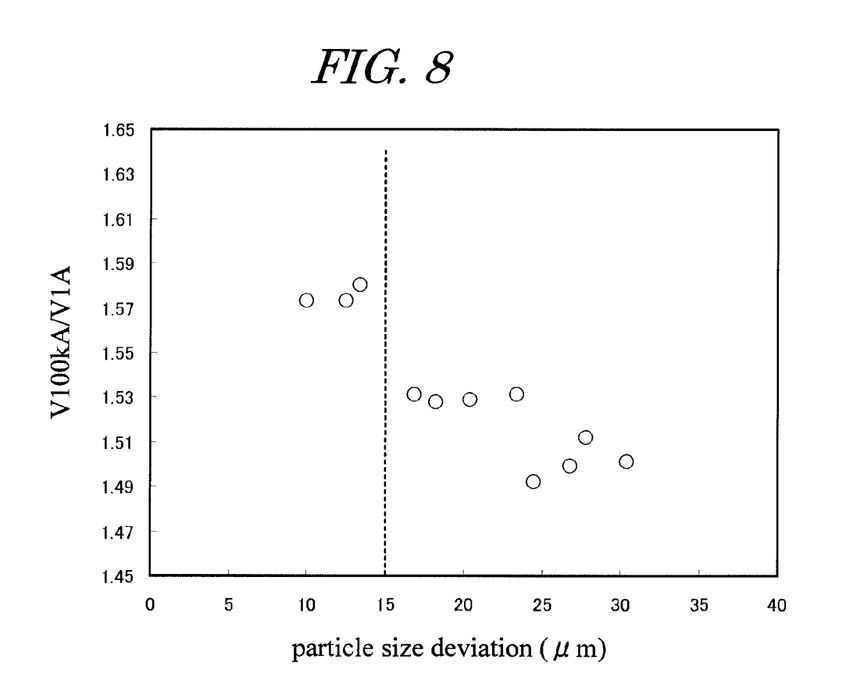
FIG. 8 is a graph of the current-voltage nonlinear resistance characteristics when the particle size distribution of the varistor powder of the present invention was varied (particle size deviation in the particle size distribution)

FIGS. 7 and 8 are graphs of the results of examining the current-voltage nonlinear resistance characteristics when the particle size distribution of the ZnO varistor powder was varied. It can be seen from these graphs that excellent current-voltage nonlinear resistance characteristics are obtained when the 50% particle size in the particle size distribution is from 20 μm to 120 μm, or when the particle size deviation in the particle size distribution is greater than or equal to 15 μm.

The reason that excellent current-voltage nonlinear resistance characteristics are obtained with a ZnO varistor powder whose mean particle diameter is from 20 μm to 120 μm is surmised to be as follows.

In the step of obtaining a spherical granulated powder in the course of producing a ZnO varistor powder, the slurry is sprayed and dried by rotating disk spraying or by spraying into air at greater than or equal to 200° C., but if an attempt is made to obtain a ZnO varistor powder whose mean particle diameter is smaller than 20 μm, it will be difficult to obtain a spherical granulated powder, and electroconductive contact between the ZnO varistor powder particles in the electric field relaxation composite shown in FIG. 3 will tend to be uneven when viewed macroscopically.

Also, if an attempt is made to obtain a ZnO varistor powder whose mean particle diameter is greater than 120 μm, then large pores will end up remaining in the ZnO varistor powder. Accordingly, excellent current-voltage nonlinear resistance characteristics can be obtained with a ZnO varistor powder whose mean particle diameter is from 20 μm to 120 μm.

Furthermore, if the particle size deviation is less than 15 μm in the particle size distribution of the ZnO varistor powder, there will be fewer electroconductive contact points between ZnO varistor powder particles in the electric field relaxation composite shown in FIG. 3.

Conversely, if the particle size deviation ((86% particle diameter−16% particle diameter)/2) is greater than or equal to 15 μm, small ZnO varistor powder particles will make their way in between the larger ZnO varistor powder particles, and more of the ZnO varistor powder particles will come into contact with each other, so superior current-voltage nonlinear resistance characteristics can be obtained.

(3) ZnO Primary Crystal Particle Size

Figure 9:
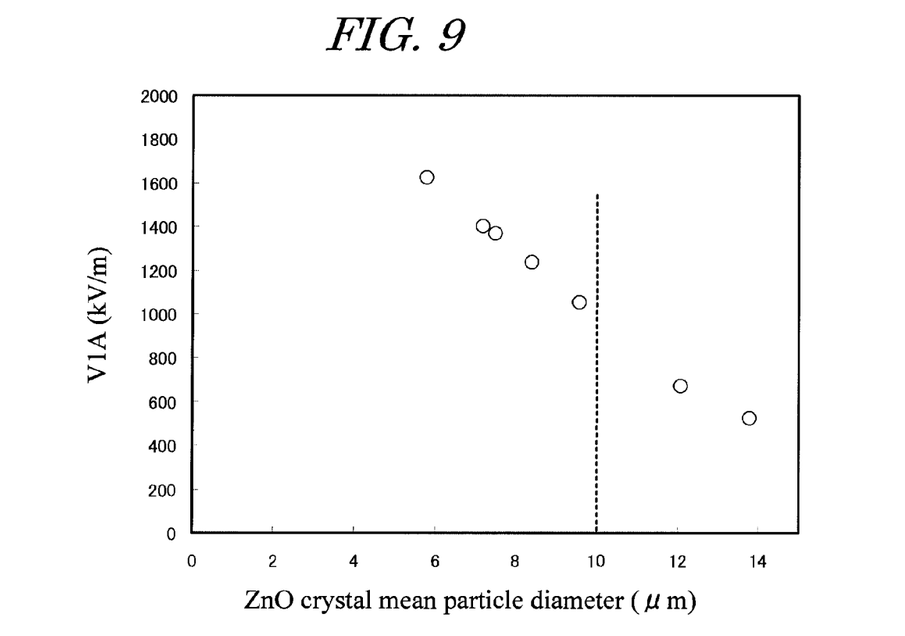
FIG. 9 is a graph of the ZnO crystal particle diameter and operating voltage (V1 A) of the varistor powder of the present invention.

The operating voltage and the mean particle diameter of the ZnO primary crystal particles of the ZnO varistor powder were examined, and FIG. 9 shows a graph of the operating voltage (V1 A) and the ZnO crystal particle diameter. As is clear from the graph, a ZnO varistor powder having a high operating voltage of greater than or equal to 1000 kV/m can be obtained by controlling the mean particle diameter of the ZnO primary crystals less than or equal to 10 μm.

The mean particle diameter of the ZnO primary crystals here was measured by subjecting a scanning electron micrograph of the ZnO varistor powder shown in FIG. 1 to image analysis, and calculating the equivalent circle diameter from the surface area of each ZnO primary crystal. A ZnO varistor powder has unique current-voltage characteristics at the particle boundary of the ZnO primary crystals, so if the ZnO primary crystals are kept small, there will be more ZnO primary crystal particle boundaries included in the ZnO varistor powder, and the operating voltage can be raised.

(4) Slurry Viscosity

An experiment was conducted in which the solids concentration of the slurry in the step of obtaining a spherical granulated powder in the course of producing a ZnO varistor powder, and the current-voltage nonlinear resistance characteristics of the ZnO varistor powder were examined. The results are shown in FIG. 10.

Figure 10:
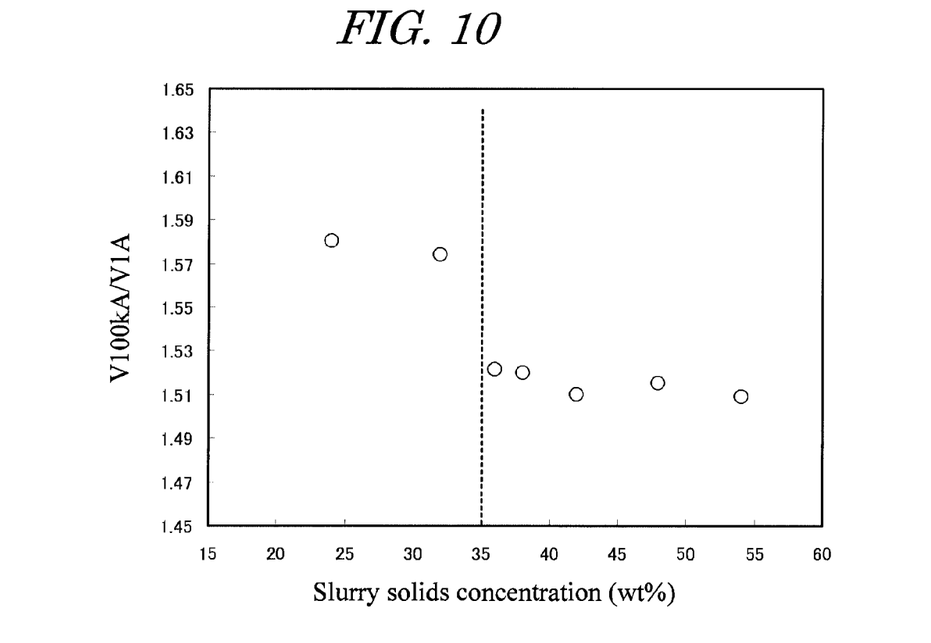
FIG. 10 is a graph of the current-voltage nonlinear resistance characteristics of the ZnO varistor powder and the solids concentration of the slurry in the present invention.

It is clear from FIG. 10 that a powder with superior current-voltage nonlinear resistance characteristics is obtained when a slurry with a solids concentration of greater than or equal to 35 wt % is spray dried and the resulting granulated powder is baked. The reason for this is that many pores end up remaining in a ZnO varistor powder produced using a slurry with a low solids concentration, and the current-voltage nonlinear resistance characteristics deteriorate.

As is clear from the embodiment given above, the preferred numerical ranges for the parameters of the ZnO varistor powder of the present invention, and the unique action and effect thereof, are as follows.

The amount of zinc oxide (ZnO) contained in the ZnO varistor powder of the present invention is preferably greater than or equal to 90 mol %. If the ZnO content is less than 90 mol %, the current-voltage nonlinear resistance characteristics of the ZnO varistor powder will deteriorate. This is attributable to the current path through the ZnO varistor powder, and since the contained ingredients other than ZnO contained in the ZnO varistor powder are mainly ingredients that become insulating crystals in the ZnO varistor powder, if the ZnO content is low, there will be more insulating crystals, and the current-voltage nonlinear resistance characteristics of the ZnO varistor powder will deteriorate.

The bulk density of the ZnO varistor powder of the present invention is preferably greater than or equal to 2.5 g/cc. If the bulk density is less than 2.5 g/cc, the current-voltage nonlinear resistance characteristics will deteriorate. If the bulk density of the ZnO varistor powder is low, this indicates that numerous pores are contained in the ZnO varistor powder, and these pores adversely affect the current-voltage nonlinear resistance characteristics.

The ZnO varistor powder of the present invention is a spherical powder in which the 50% particle diameter in the particle size distribution is preferably 20 μm to 120 μm. When dispersibility of the ZnO varistor powder in a polymer matrix, stability of contact points for electrical conduction between the ZnO varistor powder particles, and other such factors are taken into account, a spherical shape is ideal for the ZnO varistor powder. Also, when a spherical ZnO varistor powder is manufactured, the 50% particle diameter in the particle size distribution, that is, a mean particle diameter of 20 μm to 120 μm, is ideal for stable manufacture.

The particle size deviation ((86% particle diameter−16% particle diameter)/2) in the particle size distribution of the ZnO varistor powder of the present invention is preferably greater than or equal to 15 μm. If the particle size deviation is too small, there will be fewer contact points between the ZnO varistor powder particles in an electric field relaxation composite. In other words, when the ZnO varistor powder is dispersed in a polymer matrix, more ZnO varistor powder particles with a small size will make their way in between the ZnO varistor powder particles that are larger in size, and more electroconductive contact points will be obtained between the ZnO varistor powder particles, when there is a certain amount of particle diameter difference than when the particle diameter of the ZnO varistor powder is completely uniform.

The mean particle diameter of the ZnO primary crystals in the ZnO varistor powder of the present invention is preferably less than or equal to 10 μm. The operating voltage can be raised by keeping the ZnO primary crystals small. A ZnO varistor powder has unique current-voltage characteristics at the particle boundary of the ZnO primary crystals, so if the ZnO primary crystals are too large, there will be fewer ZnO primary crystal particle boundaries included in the ZnO varistor powder, and the operating voltage will decrease.

Furthermore, the ZnO varistor powder of the present invention is preferably produced by baking a granulated powder obtained by spray drying a slurry with a solids concentration of greater than or equal to 35 wt %. Excellent current-voltage nonlinear resistance characteristics can be obtained by using a slurry with a high solids concentration to produce the ZnO varistor powder. In other words, many pores end up remaining in a ZnO varistor powder produced using a slurry with a low solids concentration, and the current-voltage nonlinear resistance characteristics deteriorate.

The invention claimed is:

1. A varistor powder that is dispersed in a polymer matrix to obtain a composite used for electric field relaxation,
    wherein the main ingredient is zinc oxide (ZnO);
    at least bismuth (Bi), cobalt (Co), manganese (Mn), antimony (Sb), nickel (Ni), and aluminum (Al), calculated as $Bi_2O_3$, $CO_2O_3$, $MnO$, $Sb_2O_3$, $NiO$, and $Al^{3+}$, are contained as accessory ingredients in amounts of 0.3 to 1.5 mol % $Bi_2O_3$, 0.3 to 2.0 mol % $CO_2O_3$, 0.3 to 3 mol % MnO, 0.5 to 4 mol % $Sb_2O_3$, 0.5 to 4 mol % NiO, and 0.0005 to 0.02 mol % $Al^{3+}$; and
    the zinc oxide (ZnO) content is greater than or equal to 90 mol %;
    the bulk density is greater than or equal to 2.5 g/cc;
    the powder is a spherical powder in which the 50% particle diameter in the particle size distribution is 20 μm to 120 μm;
    the particle size deviation in the particle size distribution ((86% particle diameter−16% particle diameter)/2) is greater than or equal to 15 μm; and
    the ZnO primary crystal mean particle diameter is less than or equal to 10 μm.

2. The varistor powder according to claim 1, which is produced by
    (i) spraying and drying a slurry with a concentration of solids of greater than or equal to 35 wt % to produce a granulated powder, and
    (ii) baking the granulated powder.

* * * * *